(12) United States Patent
Lin

(10) Patent No.: US 6,734,997 B2
(45) Date of Patent: May 11, 2004

(54) METHOD OF DETECTING DEFECTS ON A TRANSPARENT FILM IN A SCANNER

(75) Inventor: Chin-Yuan Lin, Tai-Chung (TW)

(73) Assignee: Avision Inc., Hsin-Chu Hsien (TW)

( * ) Notice: Subject to any disclaimer, the term of this patent is extended or adjusted under 35 U.S.C. 154(b) by 217 days.

(21) Appl. No.: 09/683,726

(22) Filed: Feb. 7, 2002

(65) Prior Publication Data

US 2003/0035153 A1 Feb. 20, 2003

(51) Int. Cl.[7] .......................... H04N 1/04; G01N 21/00; G01N 21/84
(52) U.S. Cl. ...................... 358/487; 356/430; 356/431; 356/237.1; 356/237.2
(58) Field of Search ........................ 358/487; 356/430, 356/431, 237.1, 237.2

(56) References Cited

U.S. PATENT DOCUMENTS

| | | | | |
|---|---|---|---|---|
| 3,958,078 A | * | 5/1976 | Fowler et al. .............. | 348/127 |
| 5,642,198 A | * | 6/1997 | Long .......................... | 356/430 |
| 6,055,400 A | * | 4/2000 | Emukai et al. ............. | 399/226 |
| 6,222,624 B1 | * | 4/2001 | Yonezawa ................ | 356/237.1 |

* cited by examiner

*Primary Examiner*—Edward Coles
*Assistant Examiner*—Houshang Safaipour
(74) *Attorney, Agent, or Firm*—Winston Hsu

(57) ABSTRACT

A method for detecting defects on a transparent film in a scanner is disclosed. The scanner has a light source for exposing the transparent film. The method includes using the light source to expose the transparent film for a first predetermined time to generate a first image, using the light source to expose the transparent film for a second predetermined time to generate a second image, and comparing differences between the first image and the second image according to a time ratio of the first predetermined time and the second predetermined time so as to detect the defects on the transparent film.

7 Claims, 5 Drawing Sheets

METHOD OF DETECTING DEFECTS ON A TRANSPARENT FILM IN A SCANNER

BACKGROUND OF INVENTION

1. Field of the Invention

The present invention relates to a method for detecting defects on a transparent film in a scanner, and more specifically to a method that lengthens or shortens the exposure time to detect defects on a transparent film in a scanner.

2. Description of the Prior Art

As computer technology develops, peripheral devices also change with each passing day. The scanner is an excellent example of this. Scanners are used to scan a transparent film so as to obtain corresponding digital image signals. In general, the film is easily contaminated by dust and hair, or easily scratched. As a result, defects will be formed on the film and damage the scanned image. Therefore, high quality scanners always have the function of repairing the defects.

Please refer to FIG. 1. FIG. 1 is a functional block diagram of a prior art scanner 10. The scanner 10 is used to scan a transparent film 14. The scanner 10 comprises a white light source 12a, an infrared light source 12b, and a light sensor 16. The white light source 12a is used to generate white light, and the infrared light source 12b is used to generate infrared light. The white light is composed of red light, green light and bluelight. The light sensor 16 comprises a plurality of red light charge-coupled devices 16a arranged in order, a plurality of green light charge-coupled devices 16b arranged in order, and a plurality of blue light charge-coupled devices 16c arranged in order. The charge-coupled devices 16a, 16b and 16c each generate a corresponding electric charge when the white light passes through the transparent film 14. In addition, the light sensor 16 further comprises a plurality of infrared charge-coupled devices 16d arranged in order for generating a corresponding electric charge in the charge-coupled devices 16d when the infrared light passes through the transparent film 14. A computer system 18 electrically connects with the light sensor 16 for processing the output of the light sensor 16.

Please refer to FIG. 2. FIG. 2 is a flow chart showing how the prior art scanner 10 detects defects on the transparent film 14. The procedures of the prior art method for detecting defects on the transparent film 14 are: Step 22:Switch on the white light source 12a and scanning the transparent film 14 so as to obtain white light image signals;Step 24:Switch on the infrared light source 12b and scan the transparent film 14 so as to obtain infrared image signals;Step 26:Find out the defect positions according to the white light image signals and the infrared image signals; andStep 28:Use the computer system 18 to repair the defect positions.

In step 22 and step 24, the white light source 12a and infrared light source 12b generate white light and infrared light respectively, so as to scan the transparent film 14. After that, the white light image signals and infrared image signals will be obtained. The infrared light can pass through transparent film 14, but not transparent film 14 with the defects of dirt and scratches. The response speed of the infrared charge-coupled device 16d to the infrared light is the fastest compared with the response speed of the red light charge-coupled device 16a to the red light, green light charge-coupled device 16b to the green light, and the blue light charge-coupled device 16c to the blue light. That means the plurality of infrared light charge-coupled devices 16d arranged in order will quickly reach a saturation level after receiving the infrared light. Therefore, after step 24 is finished, the digital image signals, which are generated by the unsaturated infrared charge-coupled device 16d, represent the image signals generated by the defects of the dirt or the scratches. Therefore, the computer system 18 is able to detect the defect positions of the dirt or the scratches according to the output of the infrared charge-coupled device 16d. The computer system 18 then uses a software operation to repair and process the corresponding defect positions of the scanned image signals, so as to obtain image signals without defects of dirt or scratches and achieve the purpose of removing the dirt or scratches from the image.

However, to scan transparent film 14, the prior art scanner 10 needs to have the infrared light source 12b and the plurality of infrared charge-coupled devices 16d installed when it scans the transparent film 14. This will complicate the mechanical design of the scanner and make fabrication more difficult, increasing the cost.

SUMMARY OF INVENTION

It is therefore a primary objective of the claimed invention to provide a method for detecting defects on a transparent film in a scanner, to overcome the shortcomings of the prior art.

The claimed invention, briefly summarized, discloses a method for detecting defects on a transparent film in a scanner. The scanner has a light source for the transparent film. The method includes using the light source to expose the transparent film for a first predetermined time to generate a first image, using the light source to expose the transparent film for a second predetermined time to generate a second image, and comparing differences between the first image and the second image according to a time ratio of the first predetermined time and the second predetermined time so as to detect the defects on the transparent film.

It is an advantage that the method of the claimed invention does not need to install the infrared light source and infrared charge-coupled device. This not only reduces the cost of the electric system, but also simplifies the mechanical design of the scanner.

These and other objectives and advantages of the present invention will no doubt become obvious to those of ordinary skill in the art after reading the following detailed description of the preferred embodiment that is illustrated in the various figures and drawings.

DETAILED DESCRIPTION

Figure 1:
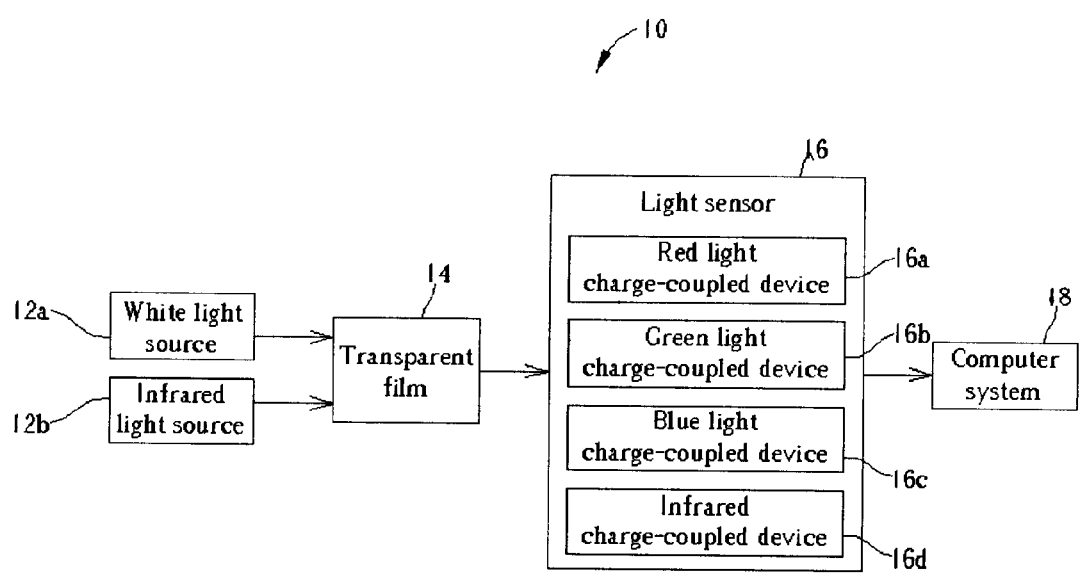
FIG. 1 is a functional block diagram of a prior art scanner.
Figure 2:
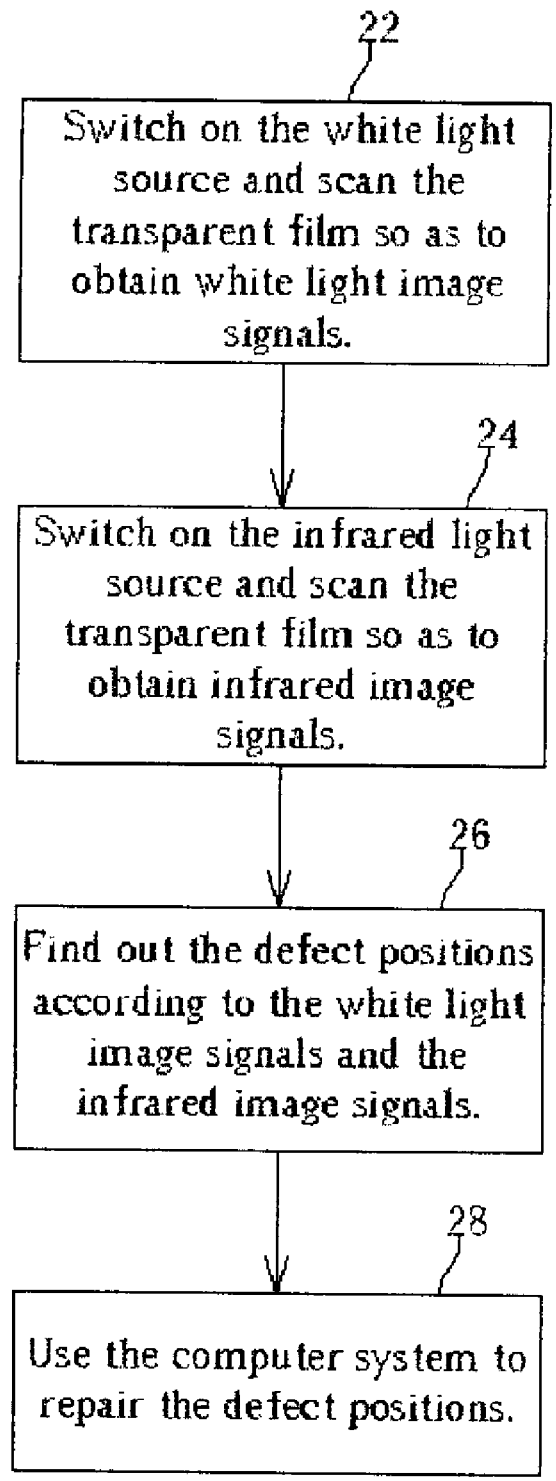
FIG. 2 is a flow chart showing how the prior art scanner detects defects on the transparent film.
Figure 3:
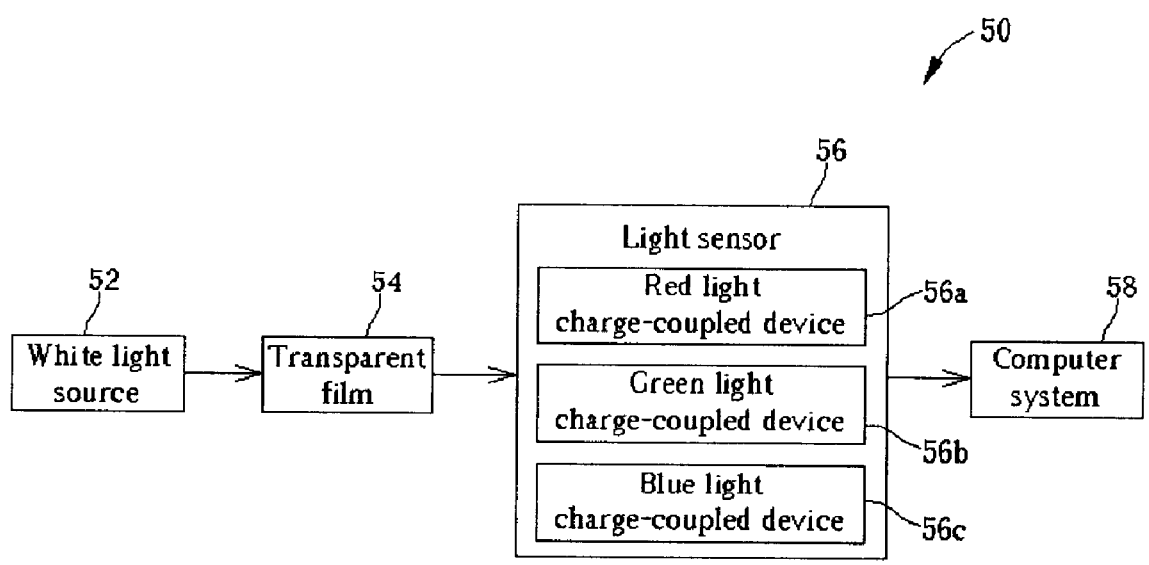
FIG. 3 is a functional block diagram of a present invention scanner.

Please refer to FIG. 3. FIG. 3 is a functional block diagram of a present invention scanner 50. The scanner 50 is used to scan a transparent film 54. The scanner 50 comprises a white light source 52 and a light sensor 56. The white light source 52 is used to generate white light (which is composed of red light, green light and blue light) so as to scan the transparent film 54. The light sensor 56 comprises a plurality of red light charge-coupled devices 56a arranged in order, a plurality of green light charge-coupled devices 56b arranged in order, and a plurality of blue light charge-coupled devices 56c arranged in order for generating corresponding electric charge in the charge-coupled devices 56a, 56b and 56c when the scanner 50 scans the transparent film 54, and then transforms the sensing result into the corresponding image signals. Furthermore, the light sensor 56 is electrically connected with a computer system 58 which is used to process the image.

Because the brightness of green light is stronger than the blue light and red light, the embodiment of the present invention uses the green light charge-coupled device 56b to detect defects on the transparent film 54. That means only the plurality of green light charged-coupled devices 56b are used to detect the component of the green light included in the white light.

Figure 4A:
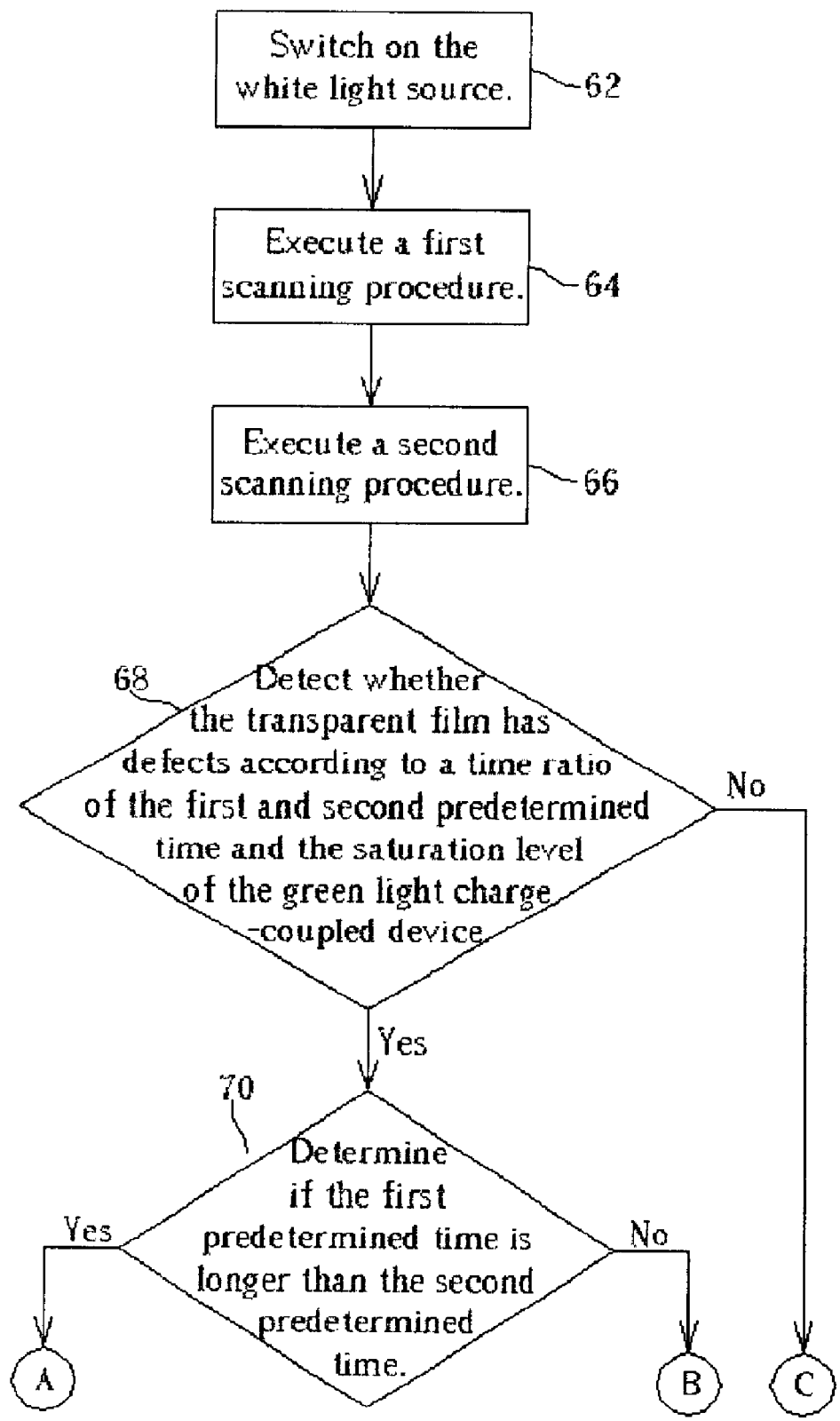
FIGS. 4A and 4B are flow charts that show how the scanner scans the transparent film.
Figure 4B:
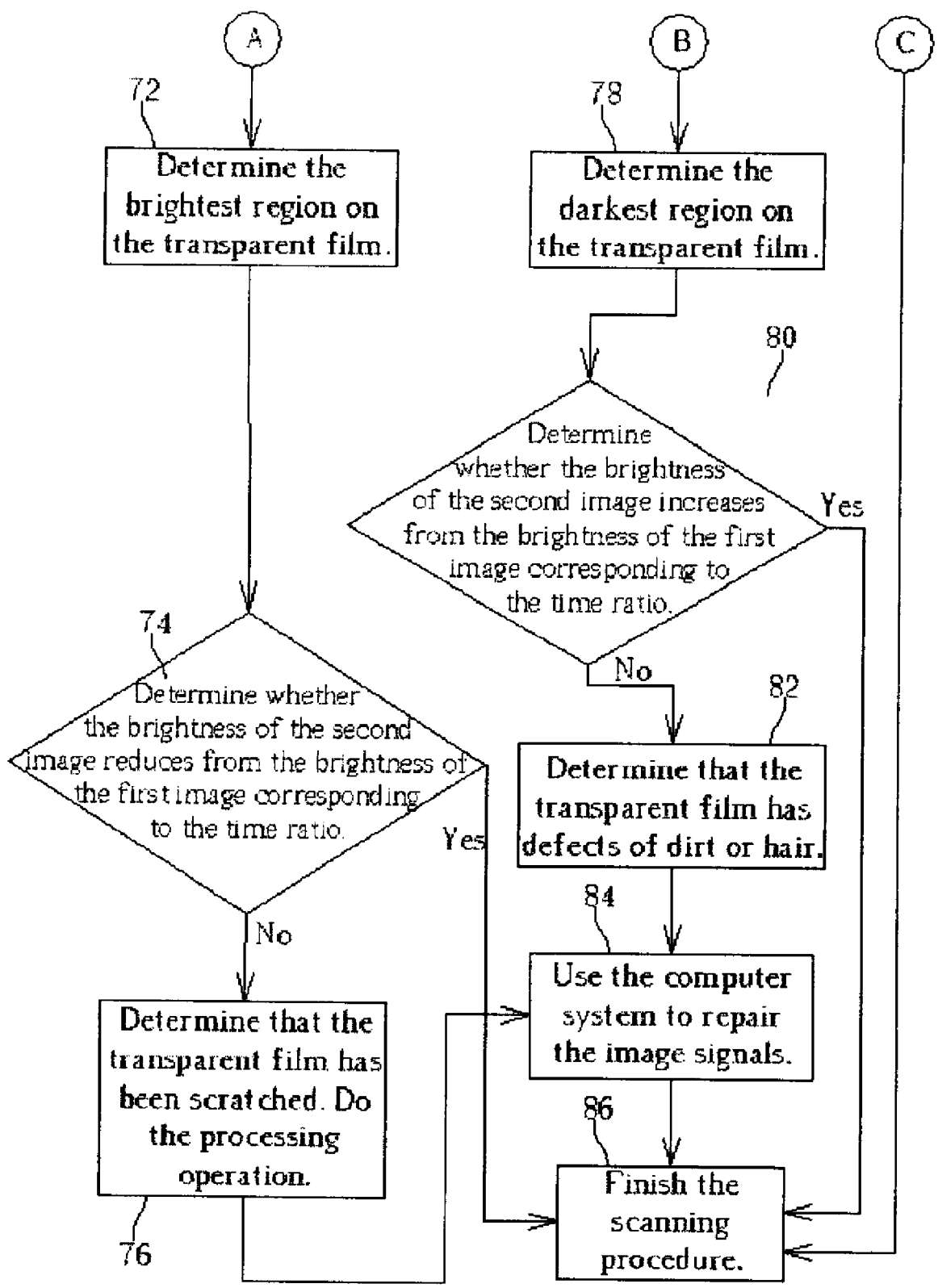

Please refer to FIG. 4A and FIG. 4B. FIG. 4A and FIG. 4B are flow charts showing how the scanner 50 scans the transparent film 54. The procedures of the present invention method for scanning the transparent film 54 are:Step 62:Switch on the white light source 52;Step 64:Execute a first scanning procedure, that is to use the light source 52 to expose the transparent film 54 for a first predetermined time so as to generate a first image;Step 66:Execute a second scanning procedure, that is to use the light source 52 to expose the transparent film 54 for a second predetermined time so as to generate a second image;Step 68:Compare the differences between the first image and the second image, according to a time ratio of the first and second predetermined time and the saturation level of the green light charge-coupled devices 56b, so as to detect the defects on the transparent film 54. If there are no defects, go to step 86. If there are defects, go to step 70;Step 70:Compare the first predetermined time with the second predetermined time. If the first predetermined time is longer than the second predetermined time, go to step 72. If the first predetermined time is shorter than the second predetermined time, go to step 78;Step 72:Determine the brightest region on the transparent film 54;Step 74:Compare the brightness of the first image and that of the second image. If the brightness of the plurality of pixels in the second image does not reduce from the brightness of the plurality of pixels in the first image corresponding to the time ratio, go to step 76, otherwise, go to step 86;Step 76:Determine that the positions of the transparent film 54, which generate the plurality of pixels in the first and second images, are complete transparent defect positions, and then go to step 84 to do the processing operation;Step 78:Determine the darkest region on the transparent film 54;Step 80:Compare the brightness of the first image and that of the second image. If the brightness of the plurality of pixels in the second image does not increase from the brightness of the plurality of pixels in the first image corresponding to the time ratio, go to step 82, otherwise, go to step 86;Step 82:Determine that the positions of the transparent film 54, which generate the plurality of pixels in the first and second images, are complete opaque defect positions, and go to step 84 to do the processing operation;Step 84:Use the computer system 58 to repair the image signals which were generated by the defects on the transparent film 5; andStep 86:Finish scanning the transparent film 54.

As mentioned above, in step 62, the white light source 52 generates white light to illuminate the transparent film 54 for a first scanning procedure and a second scanning procedure, and then the defect positions on the transparent film 54 (which is step 64 to step 68) are detected. The green light charge-coupled devices 56b can generate 256 different gray scales according to the brightness of the green light: from gray 0 to gray 255. When the transparent film 54 is opaque, the gray scale of the green light charge-coupled device 56b is 0. When the green light charge-coupled device 56b reaches the saturation level, the gray scale of the green light charge-coupled device 56b is 255. However, it is a theory value that the gray scales are 0 or 255. Actually, when the gray scale of green light charge-coupled device 56b reaches 10–20, it always represents that the green light charge-coupled device 56b only receives little green light. When the gray scale of the green light charge-coupled device 56b reaches 250, it represents that the green light charge-coupled device 56b is saturated. The purpose of step 64 to step 68 in the procedures of the present invention method is to find out the defect positions on the transparent film 54.

The defects on the transparent film 54 include a scratch which is fully cleaved, a scratch which is not fully cleaved, dirt or hair. If the image obtained after the two scan procedures does not contain defects of the transparent film 54, the long exposure time will make the green light charge-coupled device 56b gradually accumulate the weak light which passes through the transparent film 54 and reach the saturation level at last. For the scratch which is fully cleaved, the light will pass through the scratch directly and then go into the green light charge-coupled device 56b. In this case, it only takes a short amount of time to make the green light charge-coupled device 56b reach the saturation level. For scratches that are not fully cleaved, the refraction phenomenon, which is caused when the light shines on the scratch, makes a large portion of the light unable to pass through the scratch. Therefore, even if the exposure time of the scanned image is extended, the gray scale of the green light charge-coupled device 56b can only reach 10–20. For the defects of dirt or hair on the transparent film 54, no matter how much the exposure time of the image is extended, the green light charge-coupled device 56b will not receive the light passing through the defects because the light is unable to pass through the defects (which is dirt or hair). The green light charge-coupled device 56b is unable to accumulate the light to reach the saturation level, so that the gray scale of the green light charge-coupled device 56b will stay near 0. The purpose of step 70 is to compare differences between the first image and the second image. This is done by using the saturation level of the green light charge-coupled device 56b according to the time ratio of the first predetermined time and the second predetermined time of the corresponding first image and the second image. This information is used to determine whether the defect regions of the transparent film 54 are complete transparent defect regions (the brightest regions) or complete opaque defect regions (the darkest regions).

Step 72 to step 76 are used to detect the complete transparent defect regions (the brightest regions) on the transparent film 54 when the second predetermined time of the second scanning procedure is shorter than the first predetermined time of the first scanning procedure. Because the light will pass through the complete transparent defect regions directly, the green light charge-coupled device 56b will reach the saturation level quickly. Therefore, the green light charge-coupled device 56b will reach the saturation level not only during the first predetermined time of the first scanning procedure, but also during the second predetermined time of the second scanning procedure. Consequently, if the brightness of the plurality of pixels in the second image is not reduced from the brightness of the plurality of pixels in the first image corresponding to the time ratio, positions of the transparent film 54, which generate the plurality of pixels in the first and second images, are complete transparent defect positions.

Step 78 to step 82 are used to detect the complete opaque defect regions (the darkest regions) on the transparent film 54 when the second predetermined time of the second scanning procedure is longer than the first predetermined time of the first scanning procedure. The light is unable to pass through the region which contains dirt or hair. Therefore, no matter how long the exposure time is, the green light charge-coupled device 56b will not reach the saturation level. In addition, the great part of the light is also unable to pass through the regions of the scratch which is not fully cleaved, so that the green light charge-coupled device 56b also cannot reach the saturation level. Consequently, if the brightness of the plurality of pixels in the second image does not increase from the brightness of the plurality of pixels in the first image corresponding to the time ratio, positions of the transparent film 54 which generate the plurality of pixels in the first and second images are complete opaque defect positions which are caused by the scratch which is either not fully cleaved or hair. If the transparent film 54 is detected having the defects of scratch or hair in step 78 to step 82, then step 84 will be executed. Step 84 entails using the computer system 58 to repair the image signals generated by the defects on the transparent film 54 with an interpolation method or other method so as to obtain image signals without the defect image. Thus, the goal of removing the defects of scratches or dirt is achieved.

As mentioned before, in step 68, if the transparent film 54 does not have any defects, all of the plurality of the green light charge-coupled devices 56b will reach the saturation level after scanning the transparent film 54. Consequently, the procedures of the present invention method can output the image signals generated in step 66 directly after step 68 is finished.

Additionally, when detecting whether light can pass through the darkest region on the transparent film 54 or not according to the saturation level of the green light charge-coupled device 56b, the gray scale of the green light charge-coupled device 56 only needs to reach a predetermined value (100, 150 or 200), and does not necessarily need to reach 250. Only if the gray scale of the green light charge-couple device 56 reaches a predetermined value does it prove that the green light charge-coupled device 56 can receive the light passing through the darkest region on the transparent film 54.

Further, the present invention not only can use the green light charge-coupled device 56b to detect the defects on the transparent film 54, but also can use the red light charge-coupled device 56a or the blue light charge-coupled device 56c to detect the defects on the transparent film 54. However, the brightness of red light or blue light is not as strong as the green light. Therefore, a longer exposure time is needed when using the red light charge-coupled device 56a or the blue light charge-coupled device 56c to detect the defects on the transparent film 54.

In contrast to the prior art, the present invention exerts different exposure times on the transparent film 54 and compares the difference between the images detected by the charge-coupled devices according to an exposure time ratio, so as to detect whether the transparent film 54 has defects.

Therefore, the present invention does need an infrared light source and infrared charge-coupled device installed. This not only reduces the cost of the electric system, but also simplifies the mechanical design of the scanner 50.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for detecting defects on a transparent film in a scanner, the scanner comprising a light source for exposing the transparent film, the method comprising:

using the light source to expose the transparent film for a first predetermined time to generate a first image;

using the light source to expose the transparent film for a second predetermined time to generate a second image; and comparing differences between the first image and the second image according to a time ratio of the first predetermined time and the second predetermined time so as to detect the defects on the transparent film.

2. The method of claim 1 wherein if a ratio of brightness of a plurality of pixels in the first image and brightness of a plurality of corresponding pixels in the second image is not in proportion to the time ratio, positions of the transparent film which generate the plurality of pixels in the first and second images are defect positions.

3. The method of claim 2 wherein if the first predetermined time is longer than the second predetermined time, and the brightness of the plurality of pixels in the second image does not reduce from the brightness of the plurality of pixels in the first image corresponding to the time ratio, positions of the transparent film which generate the plurality of pixels in the first and second images are complete transparent defect positions.

4. The method of claim 2 wherein if the first predetermined time is shorter than the second predetermined time, and the brightness of the plurality of pixels in the second image does not increase from the brightness of the plurality of pixels in the first image corresponding to the time ratio, positions of the transparent film which generate the plurality of pixels in the first and second images are complete opaque defect positions.

5. The method of claim 1 wherein the scanner further comprises a monochromatic light sensor for detecting monochromatic light passing through the transparent film from the light source, the first and second images being generated according to saturation levels of the monochromatic light sensor.

6. The method of claim 5 wherein the monochromatic light sensor is a light sensor for detecting green light.

7. The method of claim 5 wherein the monochromatic light sensor is a charge-coupled device for detecting monochromatic light.

* * * * *